United States Patent
Meniere et al.

(10) Patent No.: US 7,362,351 B2
(45) Date of Patent: Apr. 22, 2008

(54) METHOD, SYSTEM AND DEVICE FOR DETECTING AN OBJECT PROXIMATE TO A WATER/AIR TYPE INTERFACE

(75) Inventors: Jerome Meniere, Paris (FR); Martin Lefebure, Courbevoie (FR); Frederic Guichard, Pairs (FR); Christophe Migliorini, Puteaux (FR)

(73) Assignee: Vision IQ, Boulogne (FR)

( * ) Notice: Subject to any disclaimer, the term of this patent is extended or adjusted under 35 U.S.C. 154(b) by 679 days.

(21) Appl. No.: 10/433,571

(22) PCT Filed: Dec. 5, 2001

(86) PCT No.: PCT/FR01/03842

§ 371 (c)(1), (2), (4) Date: Jun. 5, 2003

(87) PCT Pub. No.: WO02/46796

PCT Pub. Date: Jun. 13, 2002

(65) Prior Publication Data
US 2004/0036766 A1 Feb. 26, 2004

(30) Foreign Application Priority Data
Dec. 6, 2000 (FR) .................................. 00 15803
Dec. 6, 2000 (FR) .................................. 00 15805

(51) Int. Cl.
*H04N 7/18* (2006.01)
*H04N 9/47* (2006.01)

(52) U.S. Cl. ...................................... 348/143; 348/135
(58) Field of Classification Search ................ 348/143, 348/135
See application file for complete search history.

(56) References Cited

U.S. PATENT DOCUMENTS

| | | | |
|---|---|---|---|
| 4,779,095 A | 10/1988 | Guerreri | |
| 5,880,771 A * | 3/1999 | Sutton | ......................... 348/31 |
| 6,570,608 B1 * | 5/2003 | Tserng | ......................... 348/143 |
| 6,628,835 B1 * | 9/2003 | Brill et al. | .................. 382/226 |

FOREIGN PATENT DOCUMENTS

| FR | 2 763 459 | 11/1998 |
|---|---|---|
| JP | 2000 148991 | 5/2000 |

* cited by examiner

*Primary Examiner*—Mehrdad Dastouri
*Assistant Examiner*—Jeremiah C Huber
(74) *Attorney, Agent, or Firm*—Oblon, Spivak, McClelland, Maier & Neustadt, P.C.

(57) ABSTRACT

A method and system for detecting an object in a zone located proximate to an interface between two liquid and/or gaseous media having different refractive indices, for example of the air/water type. The method and system produce at least a video image of the interface and the zone and produces electric signals representing each video image. Then, the electric signals are digitized and the data is processed by discriminating the data corresponding to the video image of the real object from those corresponding to the apparent video image generated by the interface.

20 Claims, 7 Drawing Sheets

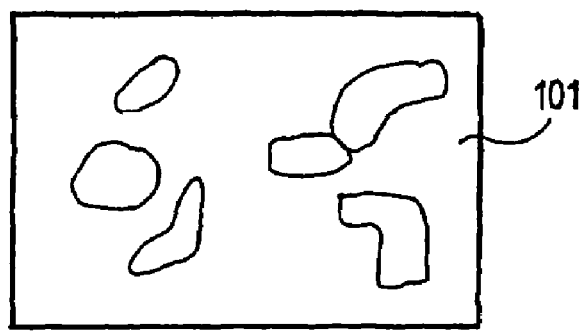
FIG_1a
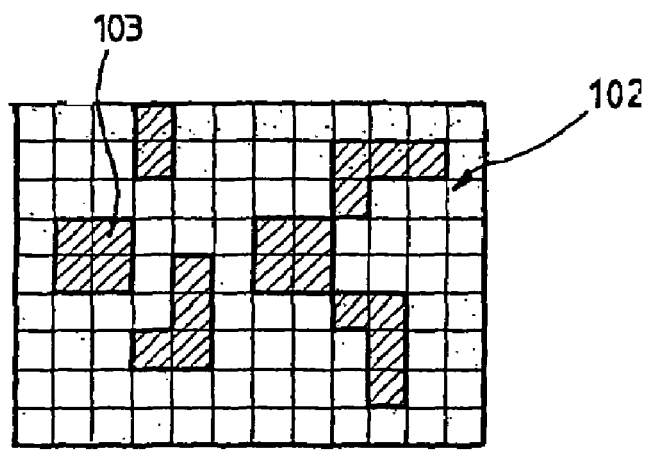
FIG_1b
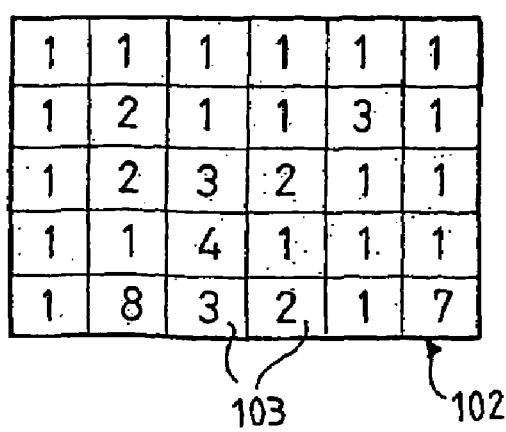
FIG_1c

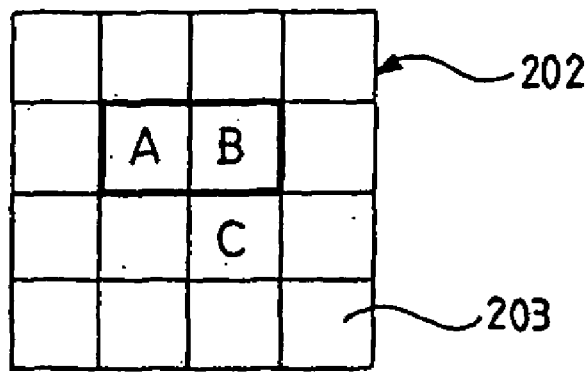
FIG_2a
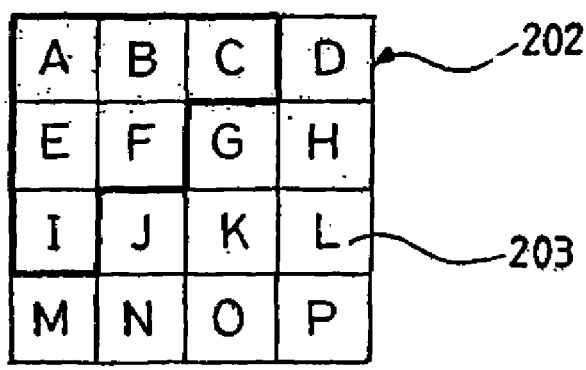
FIG_2b
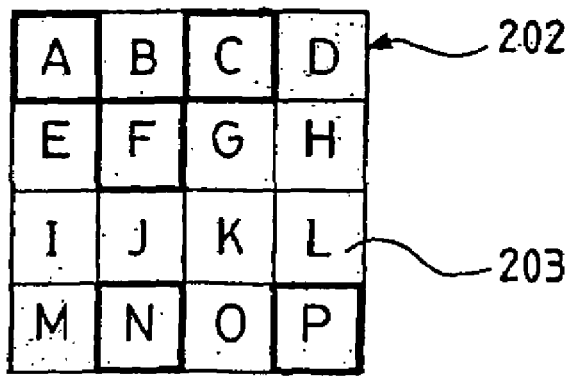
FIG_2c

FIG_3a

FIG_3b

FIG_4a

FIG_4b

FIG_5
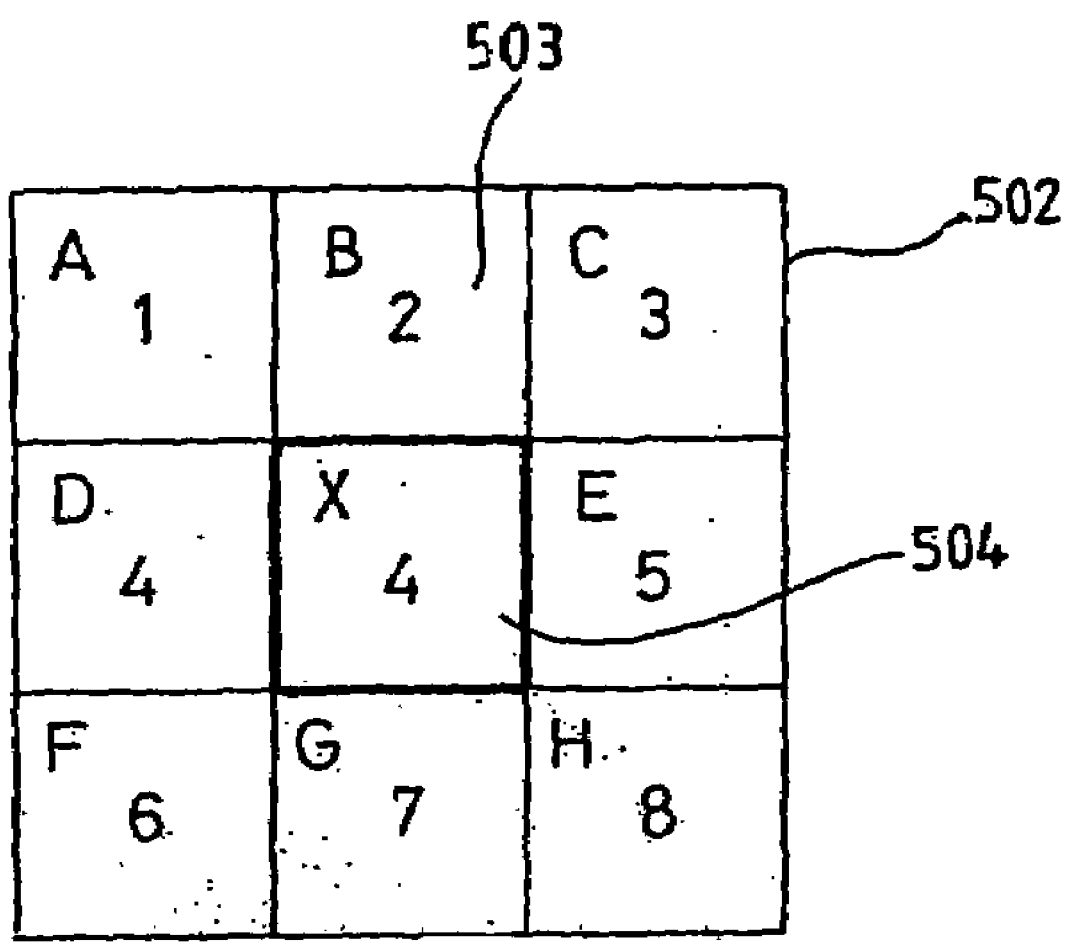

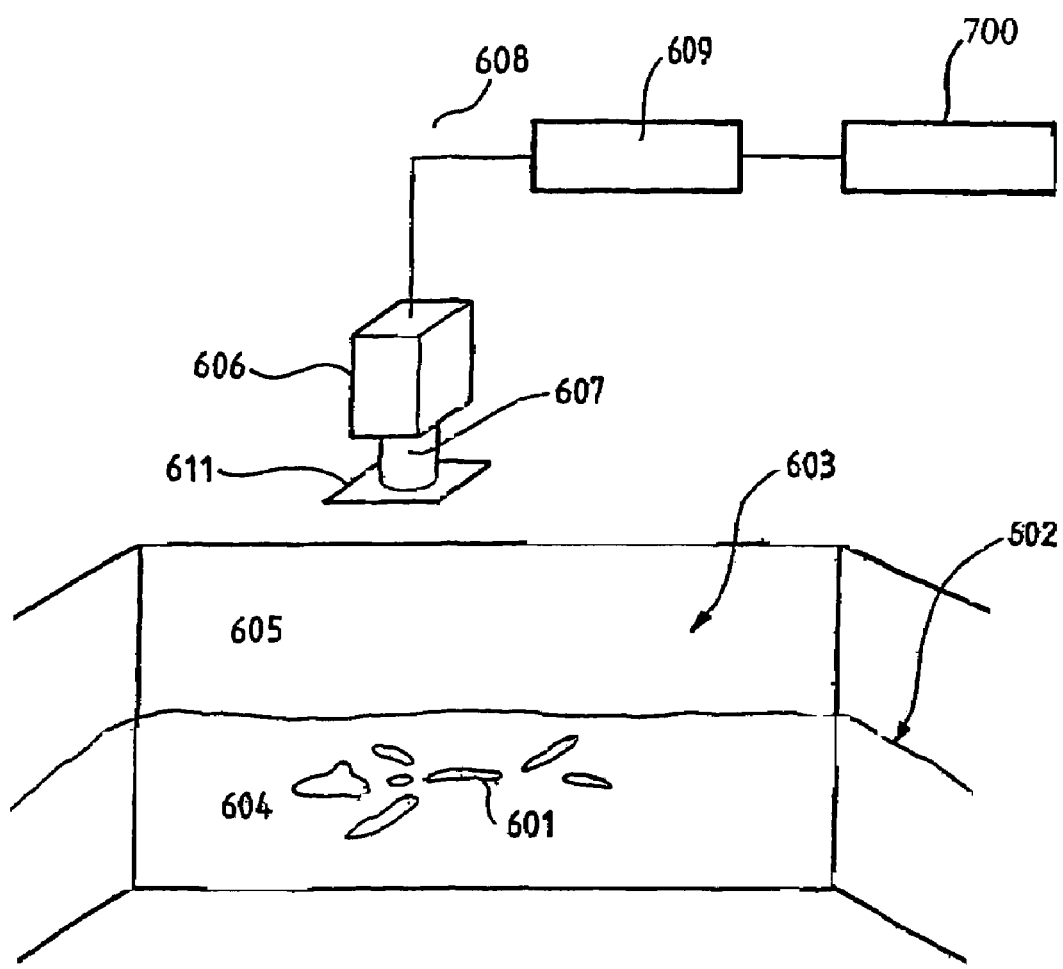

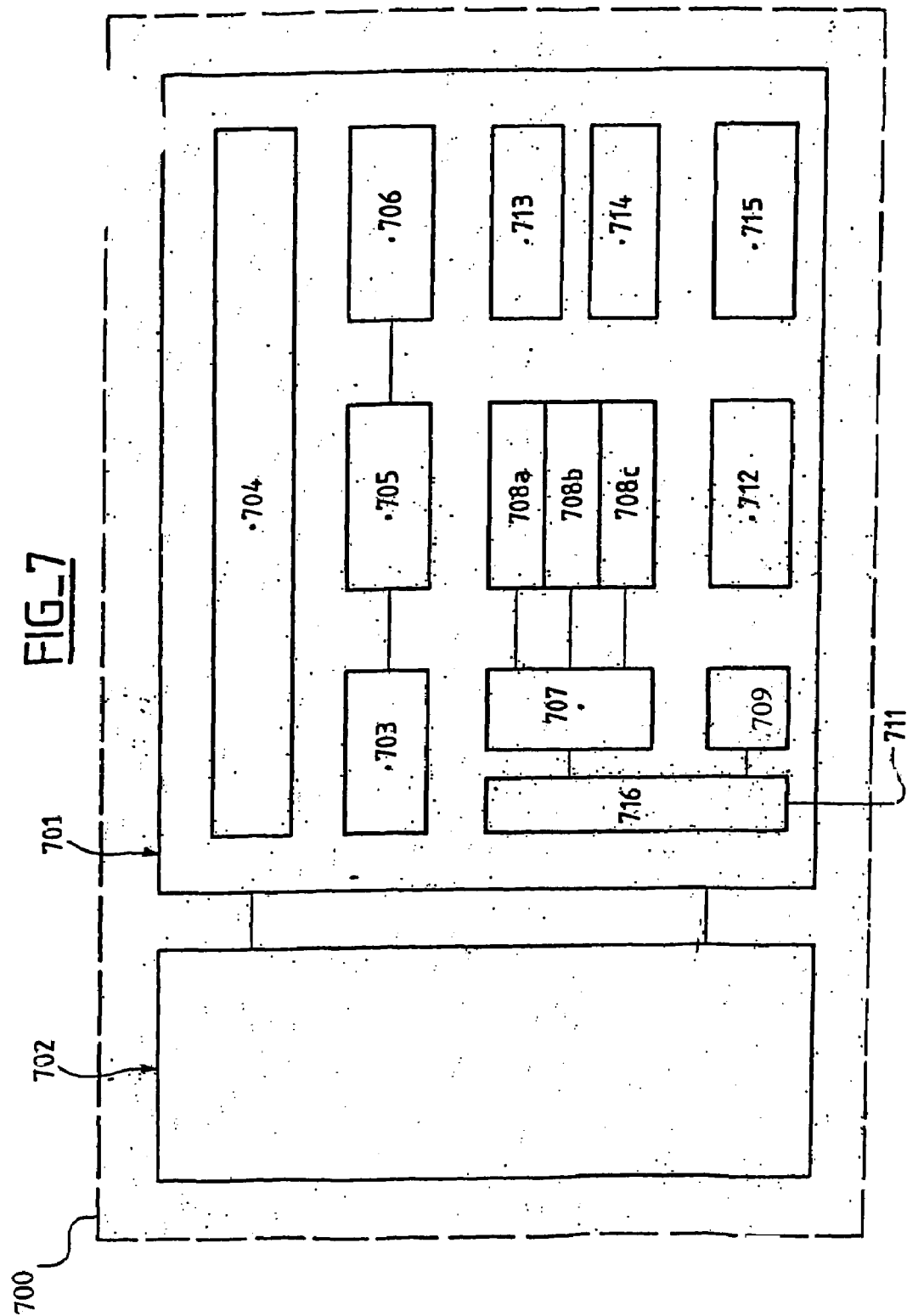
FIG_7 corps stationnaire = stationary object
corps nouveau = new object
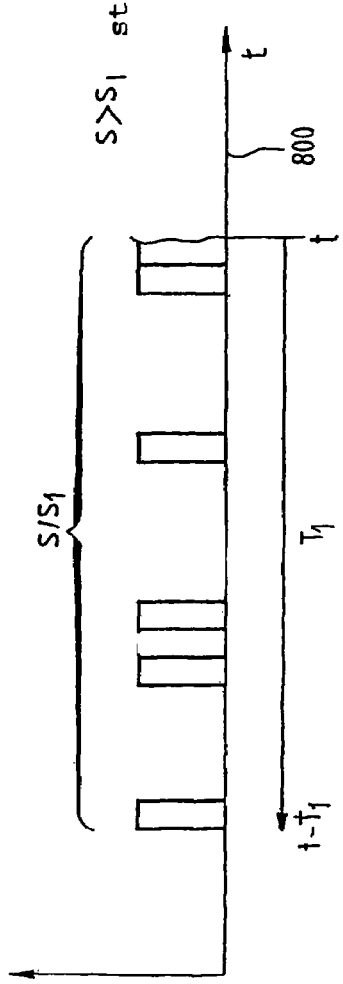
FIG_8
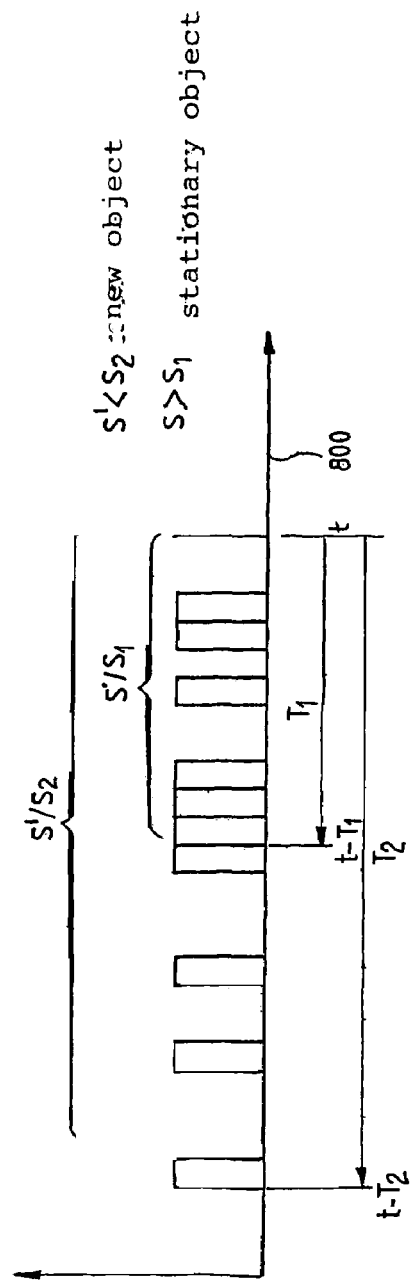
FIG_9

METHOD, SYSTEM AND DEVICE FOR DETECTING AN OBJECT PROXIMATE TO A WATER/AIR TYPE INTERFACE

The present invention relates to a method, to a system and to devices for detecting an object in a zone situated in the proximity of an interface between two liquid and/or gaseous media having different refractive indices, especially an interface of the water/air type. Within the meaning of the present invention, "in the proximity of" also denotes "at the interface".

The problem relates to the detection of the presence of an object in the vicinity of an interface of water/air type. Besides this main problem, other problems include discrimination between the objects situated on one side or the other of the interface and detection of stationary objects.

The invention will be dedicated to solving these different problems in the case, among others, of four more special applications.

First application: surveillance of swimming pools. In the case of this application, the object of the invention is to trip an alarm if a stationary object is situated under the interface formed by the surface of the water of the swimming pool. More particularly, in the case of this application, the object of the invention is to trip an alarm in the case in which the body of a swimmer has remained immersed in the water for a time that is deemed to be too long.

Second application: statistical estimation of the time of occupancy of a monitored zone. This application makes it possible to perform statistical analyses on, in particular, the occupancy of a swimming pool.

Third application: estimation of the trajectory of the objects. This application makes it possible to provide a competitive or amateur swimmer or his trainer with information about his performances during training or during a competition in a swimming pool.

Fourth application: detection of the disappearance of an object from the monitored zone. This application can be exploited in particular in the case of surveillance of swimmers at the seashore or in amusement facilities such as surf pools, for example.

Different methods exist for detection of the presence of an object in a certain zone. In general they use a plurality of video sensors installed under the level of the interface. Although efficient, these techniques are not always convenient to use. They may also cause maintenance problems, especially in swimming pools that lack galleries for engineering facilities.

Such techniques have been described by the applicant in patent applications or prior patents such as French Patent 96-10442, filed Aug. 26, 1996, or in French Application No. 99-16124, filed Dec. 21, 1999, for "Method and system for detecting an object against a background", which application was published on Jun. 22, 2001 as French Patent 2802653. Certain of the technical elements described in detail in these patents or patent applications have been included in the present application, being limited to the essentials. The prior published descriptions are therefore incorporated herewith by reference in order to complete the present description, especially as relates to application of the method and of the system according to the invention to the surveillance of swimming pools.

The present invention solves the problem of detection of objects situated in the vicinity of an interface of water/air type by proposing a method and a system capable of evaluating the position of an object relative to an interface, especially of water/air type, of discriminating moving objects from stationary objects, of generating warnings, of processing statistics, of determining elements of trajectory plotting and of permitting detection of when objects enter and leave the monitored zone.

Method

The present invention relates to a method for detecting an object in a zone situated in the proximity of an interface between two liquid and/or gaseous media having different refractive indices, especially an interface of the water/air type. Within the meaning of the present invention, "in the proximity of" also denotes "at the interface".

The method according to the invention comprises several stages. It comprises the stage of creating at least one video image of the said interface and of the said zone from at least one observation point. Each of the observation points is situated on one side of the said interface. The method according to the invention also comprises the stage of producing electrical signals representative of each video image. The method according to the invention also comprises the stage of digitizing the electrical signals in such a way as to produce data corresponding to each video image. The method according to the invention also comprises the stage of processing the said data, while discriminating the data corresponding to the video image of a real object from those that correspond to the apparent video image generated by the said interface.

Advantageously, when the object is illuminated by light that produces reflections at the said interface, the method according to the invention also comprises the stage of creating at least one video image of the said interface and of the said zone by using a polarizing filter to eliminate, at least partly, the light reflections at the said interface.

Preferably, to process the said data while discriminating the data corresponding to the said video image of a real object (601) from those corresponding to the said apparent video image generated by the said interface (602), calottes (within the meaning of the present invention) are generated and/or primitives (within the meaning of the present invention) are associated with each pixel of the said video image.

Preferably, the said method can be used in two embodiments, which are not mutually exclusive. The first, using calottes, will be referred to hereinafter as the branch 1 embodiment. The second, using primitives, will be referred to hereinafter as the branch 2 embodiment.

Branch 1

In the case of this embodiment, data processing for the purpose of discriminating the data corresponding to the video image of a real object from those that correspond to the apparent video image generated by the said interface is achieved by using the following stages:

the stage of generating calottes,
the stage of associating characteristics with each calotte,
the stage of deducing the presence of an object if the said characteristics exceed a predetermined threshold SC.

In the present application, the concepts of calottes and of characteristics have the meaning defined hereinafter.

In the case of this embodiment, when the method is intended more particularly to discriminate, in a given zone, between a stationary object and a moving object, the said method comprises several additional stages. The method comprises the stage of iterating, at specified time intervals, the previously described process of deducing presence. The method also comprises the stage of calculating the number of times that the object is detected during a specified time period T1. The method also comprises the stage of discriminating, at a point of the said zone, between the objects that are present a number of times larger than a specified threshold S1 and the objects that are present a number of times smaller than the said specified threshold S1. In the first case, the said objects are referred to hereinafter as stationary objects, and in the second case the said objects are referred to hereinafter as moving objects.

Preferably, in the case of stationary objects, to determine whether a stationary object is situated:
- on the other side of the interface,
- on the same side of the interface,
- at the interface relative to one of the said observation points, the said method comprises several stages. It comprises the stage of calculating the mean fluctuation per unit time of the gray levels of the said video images of the said object. For this purpose, the video images are recorded from the said observation point at specified time intervals. Three cases can be considered:

Case in which the Object is Situated on the Other Side of the Interface

In the case in which the object is situated on the other side of the interface, the method according to the invention also comprises the stage of detecting, at a point of the said zone, the objects that exhibit a mean fluctuation per unit time of the gray levels larger than a specified threshold S3. The said objects are referred to hereinafter as objects situated on the other side of the interface.

Case in which the Object is Situated on the Same Side of the Interface

In the case in which the object is situated on the same side of the interface, the method also comprises the stage of detecting, at a point of the said zone, the objects that exhibit a mean fluctuation per unit time of the gray levels smaller than a specified threshold S4, the said threshold S4 being smaller than threshold S3. The said objects are referred to hereinafter as objects situated on the same side of the interface.

Case in which the Object is Situated at the Interface

In the case in which the object is situated at the interface, the method also comprises the stage of detecting, at a point of the said zone, the objects that exhibit a mean fluctuation per unit time of the gray levels between threshold S3 and threshold S4. The said objects are referred to hereinafter as objects situated at the interface.

According to another embodiment, in the case of stationary objects, to determine whether a stationary object is situated:
- on the other side of the interface,
- on the same side of the interface,
- at the interface relative to one of the said observation points, the said method also comprises the stage of performing a stereoscopic analysis of the object that is stationary relative to the said interface. For this purpose, the video images are recorded from the said observation point at specified time intervals.

Preferably, the method using one or the other of the two methods cited hereinabove also includes the stage of emitting a warning signal according to the detection criteria applied in one or the other of the said methods, especially in the presence of a stationary object situated under the surface of a water/air interface.

In the case of the embodiment according to the first branch, when the method is intended more particularly to detect the appearance of new objects in the said zone, the said method also comprises several stages. The said method comprises the stage of iterating, at specified time intervals, the process of deducing the presence of an object, as was described previously. The said method also comprises the stage of calculating the number of times that the said object is detected during a specified time period T2. The said time period T2 is chosen to be longer than the duration of the phenomena associated with the objects being detected. The said method also comprises the stage of discriminating, at a point of the said zone, between the objects that are present a number of times larger than a specified threshold S2 and the objects that are present a number of times smaller than the said specified threshold S2. In the first case, the objects are referred to hereinafter as usually present objects, and in the second case the said objects are referred to hereinafter as new objects.

Advantageously, when the method is intended more particularly to detect objects that are both new and stationary, time period T1 is chosen to be shorter than time period T2.

In the case of the version according to the first branch, when the method is intended more particularly to yield a statistical estimate of the time of occupancy of a specified zone Z by at least one object during a specified time period T, the said method comprises several additional stages. The said method comprises the stage of performing a partition of the said zone into elemental zones $\Delta z$. The said method also comprises the stage of applying the process of deducing the presence of an object in an elemental zone $\Delta z$ during elemental time intervals $\Delta t$. The said method also comprises the stage of calculating the number of times $\Delta t/T$ that an object is present in an elemental zone $\Delta z$ during the specified time period T.

In the case of the version according to the first branch, the method also comprises the stage of calculating the trajectory of objects whose presence has been detected. When the method is also intended more particularly to detect the disappearance of an object in a specified zone, especially the disappearance of a swimmer at the seashore, the said method also comprises the stage of detecting when a trajectory stops at the boundary of the said zone, especially beyond the surveillance limits.

Branch 2

In the case of the branch 2 embodiment, when the method according to the invention is intended in particular to detect a stationary object in the proximity of the said interface, the data processing for the purpose of discriminating the data corresponding to the video image of a real object from those that correspond to the apparent video image generated by the said interface is achieved by using the following stages. The said method comprises the stage of associating primitives with each pixel of the said video image. The said method also comprises the stage of validating a primitive as stationary if, during n successive time intervals $\Delta t$ composing a specified time period T5, the said primitive is materialized at least a number of times larger than a specified threshold S5. The said method also comprises the stage of calculating and searching for the virtual images of stationary objects.

In the present application, the concepts of primitives, of materialized primitives and of virtual images of stationary objects have the meaning defined hereinafter.

In the case of the branch 2 embodiment, when the method is intended more particularly to detect a new stationary object in the proximity of the said interface, the said method comprises several stages. The said method comprises the stage of iterating, at successive time intervals Δt composing a specified time period T6, the process, defined hereinabove in branch 2, of detecting the presence of a stationary object. The said method also comprises the stage of calculating the number of times that an object is detected as being stationary during the said specified time period T6. The said time period T6 is chosen to be longer than the duration of the phenomena associated with the object being detected. The said time period T6 is chosen to be shorter than the said time period T5. The said method also comprises the stage of discriminating, at a point of the said zone, between a stationary object that is present a number of times larger than a specified threshold S6 and an object that is present a number of times smaller than the said specified threshold S6. The said object is referred to hereinafter as the new stationary object.

In the case of the branch 2 embodiment, when the method is intended more particularly to determine whether a new stationary object is situated:

on the other side of the interface,
on the same side of the interface,
at the interface relative to one of the said observation points, the said method comprises several additional stages. The said method comprises the stage of iterating, at successive time intervals Δt composing a specified time period T7, the process, as defined in branch 2, of detecting the presence of a stationary object. For this purpose, the video images are recorded from the said observation point at specified time intervals. The said method also comprises the stage of calculating the number of times that an object is detected as being stationary and new during the said specified time period T7. The said time period T7 is chosen to be longer than the duration of the phenomena being observed. The said time period T7 is shorter than the said time period T6. Three cases can be considered:

Case in which the Object is Situated on the Other Side of the Interface

In the case in which the object is situated on the other side of the interface, the said method also comprises the stage of detecting, at a point of the said zone, between an object that is present a number of times larger than a specified threshold S7 and an object that is present a number of times smaller than the said specified threshold S7. The said object is referred to hereinafter as the new stationary object situated on the other side of the interface.

Case in which the Object is Situated on the Same Side of the Interface

In the case in which the object is situated on the same side of the interface, the said method also comprises the stage of detecting, at a point of the said zone, between an object that is present a number of times larger than a specified threshold S8 and an object that is present a number of times smaller than the said specified threshold S8. The said threshold S8 is smaller than threshold S7. The said object is referred to hereinafter as the new stationary object situated on the same side of the interface.

Case in which the Object is Situated at the Interface

In the case in which the object is situated at the interface, the said method also comprises the stage of detecting, at a point of the said zone, an object that is present a number of times between threshold S7 and threshold S8. The said objects are referred to hereinafter as objects situated at the interface.

The method according to the invention also includes the stage of emitting a warning signal according to the detection criteria applied in the case in which the object is situated on the same side of the interface, at the interface or on the other side of the interface. Preferably, the method includes the stage of emitting a signal in the presence of a stationary object situated under the surface of a water/air interface.

System

The invention also relates to a system and to devices for detecting an object in a zone situated in the proximity of an interface between two liquid and/or gaseous media having different refractive indices, especially an interface of the water/air type. Within the meaning of the present invention; "in the proximity of" also denotes "at the interface".

The said system comprises means, especially a video camera, for creating at least one video image of the said interface and of the said zone from at least one observation point.

Each of the observation points is situated on one side of the said interface. The said system also comprises digital conversion means for producing digital data from the electrical signals representative of each video image. The said system also comprises information-processing means for discriminating the data corresponding to the video image of a real object from those corresponding to the apparent video image generated by the said interface.

Advantageously, when the said object is illuminated by light that produces reflections at the said interface, the said system is such that the said means for creating at least one video image of the said interface and of the said zone comprise a polarizing filter to eliminate, at least partly, the light reflections at the said interface.

Preferably, the said information-processing means for discriminating the data corresponding to the said video image of a real object (601) from those corresponding to the said apparent video image generated by the said interface (602) comprise calculating means (702) (701) for:

generating calottes (within the meaning of the present invention), and/or associating primitives with each pixel of the said video image (within the meaning of the present invention).

Preferably, the said system can be used in two embodiments, which are not mutually exclusive. The first, using calottes, will be referred to hereinafter as the branch 1 embodiment. The second, using primitives, will be referred to hereinafter as the branch 2 embodiment.

Branch 1

In the case of this embodiment, the said means for information-processing of the data for the purpose of discriminating the data corresponding to the video image of a real object from those that correspond to the apparent video image generated by the said interface comprise calculating means for:

generating calottes,
associating characteristics with each calotte,
deducing the presence of an object if the said characteristics exceed a predetermined threshold SC.

In the case in which the said system is intended more particularly to discriminate between a stationary object and a moving object, the said system comprises iterating means for iterating, at specified time intervals, the process, described hereinabove, for deducing the presence of an object. In this case, the said calculating means comprise totalizers for calculating the number of times that the object is detected during a specified time period T1. The said calculating means also comprise discriminators for discriminating, at a point of the said zone, between the objects that are present a number of times larger than a specified threshold S1 and the objects that are present a number of times smaller than the said specified threshold S1. In the first case, the said objects are referred to hereinafter as stationary objects, and in the second case the said objects are referred to hereinafter as moving objects.

According to the branch 1 embodiment, in the case in which the system is intended more particularly to determine whether a stationary object is situated:

on the other side of the interface,
on the same side of the interface,
at the interface relative to one of the said observation points, the said calculating means also comprise means for calculating the mean fluctuation per unit time of the gray levels of the said video images of the said object. For this purpose, the video images are recorded from the said observation point at specified time intervals. Three cases can be considered:

Case in which the Object is Situated on the Other Side of the Interface

In the case in which the object is situated on the other side of the interface, the said calculating means also comprise detecting means S3 for detecting, at a point of the said zone, the objects that exhibit a mean fluctuation per unit time of the gray levels larger than a specified threshold S3. The said objects are referred to hereinafter as objects situated on the other side of the interface.

Case in which the Object is Situated on the Same Side of the Interface

In the case in which the object is situated on the same side of the interface, the said calculation means also comprise detecting means S4 for detecting, at a point of the said zone, the objects that exhibit a mean fluctuation per unit time of the gray levels smaller than a specified threshold S4, the said threshold S4 being smaller than threshold S3. The said objects are referred to hereinafter as objects situated on the same side of the interface.

Case in which the Object is Situated at the Interface

In the case in which the object is situated at the interface, the said calculating means also comprise detecting means S3/S4 for detecting, at a point of the said zone, the objects that exhibit a mean fluctuation per unit time of the gray levels between threshold S3 and threshold S4. The said objects are referred to hereinafter as objects situated at the interface.

According to another embodiment, in the case of stationary objects, when the said system is intended more particularly to determine whether a stationary object is situated:

on the other side of the interface,
on the same side of the interface,
at the interface relative to one of the said observation points, the said system also comprises means for stereoscopic analysis of the object that is stationary relative to the said interface. For this purpose, the video images are recorded from the said observation point at specified time intervals.

Preferably, the said system using one or the other of the two preceding methods also includes emitting means for emitting a warning signal according to the detection criteria described hereinabove, especially in the presence of a stationary object situated under the surface of a water/air interface.

In the case of the embodiment constituting the object of the first branch, when the system according to the invention is intended more particularly to detect the appearance of new objects in the said zone, the said system comprises iterating means for iterating, at specified time intervals, the process, described hereinabove, of deducing the presence of an object.

The said calculating means also comprise means for calculating the number of times that the object is detected during a specified time period T2. The said time period T2 is chosen to be longer than the duration of the phenomena associated with the objects being detected. The said calculating means also comprise discriminating means for discriminating, at a point of the said zone, between the objects that are present a number of times larger than a specified threshold S2 and the objects that are present a number of times smaller than the said specified threshold S2. The said objects are referred to hereinafter as usually present objects and as new objects respectively.

Advantageously, when the system is intended more particularly to detect new and stationary objects, time period T1 is chosen to be shorter than time period T2.

In the case of the embodiment according to the first branch, when the system is intended more particularly to yield a statistical estimate of the time of occupancy of the said zone Z by at least one object during a specified time period T, the said system comprises partitioning means for performing a partition of the said zone into elemental zones $\Delta z$. In this case, the said system also comprises iterating means for iterating the process of deducing the presence of an object in an elemental zone $\Delta z$ during elemental time intervals $\Delta t$. In this case also, the said calculating means also comprise means for calculating the number of times $\Delta t/T$ that an object is present in an elemental zone $\Delta z$ during the specified time period T.

In the case of the embodiment according to the first branch, the said calculating means also comprise means for calculating the trajectory of objects whose presence has been detected. In this case, when the system is intended more particularly to detect the disappearance of an object in a specified zone, especially the disappearance of a swimmer at the seashore, the said system also comprises detecting means for detecting when a trajectory stops at the boundary of the said zone, especially beyond the surveillance limits.

Branch 2

In the case of the branch 2 embodiment, when the said system according to the invention is intended more particularly to detect a stationary object in the proximity of the said interface, the said information-processing means for discriminating the data corresponding to the video image of a real object from those corresponding to the apparent video image generated by the said interface comprise calculating means exhibiting the technical features described hereinafter. The said calculating means comprise associating means for associating primitives with each pixel of the said video image. The said calculating means also comprise validating means for validating a primitive as stationary if, during n successive time intervals Δt composing a specified time period T5, the said primitive is materialized at least a number of times larger than a specified threshold S5. The said calculating means also comprise means for calculating and searching for the virtual images of stationary objects.

In the case of the embodiment constituting the object of the second branch, when the said system is intended more particularly to detect a new stationary object in the proximity of the said interface, the said system comprises iterating means for iterating, at successive time intervals Δt composing a specified time period T6, the process of detecting the presence of a stationary object. In this case, the said calculating means also comprise means for calculating the number of times that an object is detected as being stationary during the said specified time period T6. The said time period T6 is chosen to be longer than the duration of the phenomena associated with the object being detected. The said time period T6 is shorter than the said time period T5. In this case also, the said calculating means comprise discriminating means for discriminating, at a point of the said zone, between a stationary object that is present a number of times larger than a specified threshold S6 and an object that is present a number of times smaller than the said specified threshold S6. The said object is referred to hereinafter as the new stationary object.

In the case of the embodiment constituting the object of the second branch, when the system is intended more particularly to determine whether a new stationary object is situated:

on the other side of the interface,
on the same side of the interface,
at the interface relative to one of the said observation points, the said system also comprises iterating means for iterating, at successive time intervals Δt composing a specified time period T7, the process of detecting the presence of a stationary object. For this purpose, the video images are recorded from the said observation point at specified time intervals. In this case also, the said calculating means also comprise means for calculating the number of times that an object is detected as being stationary and new during the said specified time period T7. The said time period T7 is chosen to be longer than the duration of the phenomena being observed. The said time period T7 is shorter than the said time period T6. Three cases can be considered:

Case in which the Object is Situated on the Other Side of the Interface

In the case in which the object is situated on the other side of the interface, the said calculating means comprise detecting means for detecting, at a point of the said zone, between an object that is present a number of times larger than a specified threshold S7 and an object that is present a number of times smaller than the said specified threshold S7. The said object is referred to hereinafter as the new stationary object situated on the other side of the interface.

Case in which the Object is Situated on the Same Side of the Interface

In the case in which the object is situated on the same side of the interface, the said calculating means also comprise detecting means for detecting, at a point of the said zone, between an object that is present a number of times larger than a specified threshold S8 and an object that is present a number of times smaller than the said specified threshold S8. The said threshold S8 is smaller than threshold S7. The said object is referred to hereinafter as the new stationary object situated on the same side of the interface.

Case in which the Object is Situated at the Interface

In the case in which the object is situated at the interface, the said calculating means comprise detecting means for detecting, at a point of the said zone, an object that is present a number of times between threshold S7 and threshold S8. The said objects are referred to hereinafter as objects situated at the interface.

In these three different cases, the system also includes emitting means for emitting a warning signal according to the detection criteria applied in one or the other of these cases, especially in the presence of a stationary object situated under the surface of a water/air interface.

The invention also relates to a method that is intended more particularly for surveillance of a swimming pool. The method for surveillance of swimming pools according to the invention is achieved by using all or part of the stages described hereinabove.

The invention also relates to a system that is intended more particularly for surveillance of a swimming pool. The system for surveillance of swimming pools according to the invention is achieved by using all or part of the technical means described hereinabove.

The invention also relates to an application of the method described hereinabove to surveillance of a swimming pool.

The invention also relates to an application of the system described hereinabove to surveillance of a swimming pool.

Definitions

The definitions explained hereinafter of the technical terms employed are illustrated by examples with reference to FIGS. 1a, 1b, 1c, 2a, 2b, 2c, 3a, 3b, 4a, 4b and 5. These figures represent an image composed of a grid of pixels, on which the values thereof have been indicated.

Image, Grid, Pixel, Pixel Value

A pixel is defined as follows: an elemental zone of an image obtained by creating a grid, generally regular, of the said image. When the image originates from a sensor such as a video camera or a thermal or acoustic camera, a value can generally be assigned to this pixel: the color or gray level for a video image, or the temperature for a thermal camera.

EXAMPLE

FIG. 1a represents an image 101, symbolized by a man swimming on the surface of a swimming pool, whose contours are not fully visible. In fact, among the applications of the present invention, one relates more particularly to surveillance of swimming pools, and it is with reference to this application that the technical features constituting the invention will be explained. In FIG. 1b, a grid 102 of pixels 103 is superposed on this image. FIG. 1c shows a grid on which the values of the pixels are indicated.

Adjacent Pixels

Two pixels of the grid are said to be adjacent if their edges or corners are touching.

Path on the Grid

A path on the grid is an ordered and finite set of pixels in which each pixel is adjacent to that following it (in the direction of ordering). The size of a path is given by the number of pixels of which it is composed.

Joined Pixels

Two pixels are said to be joined when the shortest path beginning at one and ending at the other is of size smaller than a specified number of pixels.

Connected Set of Pixels

A set of pixels is said to be connected if, for each pair of pixels of the set, there exists a path beginning at one and ending at the other, this path being composed of pixels of the set.

EXAMPLE

FIG. 2a represents a grid 202 of 16 pixels 203, among which 3 pixels are specifically identified as A, B and C. It can be noted that pixels A and B are adjacent, and that pixels B and C are adjacent. Thus there exists a path (A→B→C) that links these pixels. The set of pixels {A, B, C} is therefore connected.

FIG. 2b also shows a grid 202 of 16 pixels 203, identified by the letters A to P. If the set of pixels {A, B, C, E, F, I} is selected, it can be noted that pixels A and B are adjacent, that pixels B and C are adjacent, and so on. Thus there exist the following paths: A →B→C and C →B →F →E →I. Each pair of pixels of the set is linked by a path of pixels belonging to the set, and so the set of pixels {A, B, C, E, F, I} is connected.

FIG. 2c shows the same grid 202 as in FIG. 2b, with the set of pixels {A, C, F, N, P} selected. There exists a path A→C→F linking the pixels A, C and F, but there does not exist a path of pixels that belongs to the set and that links N and P or else N to A. The set of pixels {A, C, F, N, P} is not connected. In contrast, the set {A, C, F} is connected.

Pixel Adjacent to a Set

A pixel that does not belong to a set is said to be adjacent to the said set when it is joined to at least one pixel belonging to the said set.

Calotte

A positive (or negative) calotte is defined as a connected set of pixels whose values are larger (or smaller) than a predetermined value and satisfying the following condition:
the values of the pixels adjacent to the set (not members of the set) are smaller than or equal to (or larger than or equal to) the said predetermined value,
such that the values of the pixels located in the said set are larger (or smaller) than the values of the pixels adjacent to the set.

A calotte is said to be a positive calotte or a negative calotte.

Level of a Calotte

The level of a calotte is defined as the said predetermined value.

EXAMPLE

FIGS. 3a, 3b, 3c and 3d represent images composed of grids 302 of pixels 303, on which their values are indicated.

FIG. 3a represents (in the interior 304 of the bold line 305) a set of 4 pixels. This set has the following properties:
it is connected within the meaning of the given definition,
the values of all of the pixels of the set are larger than 1,
some of the (twelve) pixels adjacent to the set have values larger than 1.

Thus the set of pixels in question is not a positive calotte of level 1.

In contrast, this set of pixels has the following properties:
it is connected within the meaning of the given definition,
the values of all of the pixels of the set are larger than 2,
all of the (twelve) pixels joined to the set have a value smaller than or equal to 2.

This set of pixels is therefore a positive calotte of level 2.

FIG. 3b represents a set 306 of eight pixels having the following properties:
it is connected within the meaning of the given definition,
the values of all of the pixels of the set are larger than 1,
all of the (eighteen) pixels joined to the set have a value smaller than or equal to 1.

Thus the set of pixels in question is a positive calotte of level 1.

FIG. 4a represents a grid 402 of pixels 403. Inside this grid 402 a bold line 405 isolates a set 404 of ten pixels distributed into two zones 404a and 404b. This set 404 of pixels has the following properties:
it is not connected within the meaning of the given definition,
the values of all of the pixels are larger than 1,
all of the (twenty-five) pixels joined to the set have a value smaller than or equal to 1.

Thus the ten pixels of this non-connected set do not comprise a positive calotte of level 1.

FIG. 4b represents a set 406 of twelve pixels having the following properties:
it is connected within the meaning of the given definition,
the values of the pixels are not all larger than 1,
all of the (twenty-four) pixels joined to the set have a value smaller than or equal to 1.

Thus the set of pixels in question is not a positive calotte of level 1.

Characteristic(s) Associated with a Calotte

A characteristic or characteristics associated with a calotte is or are defined as a value or values obtained by predefined arithmetic and/or logical operations from the values of the pixels of the calotte, and/or from the positions of the pixels in the grid, and/or from the level of the calotte.

For example, an arithmetic operation could comprise using the sum of the differences between the value of each pixel of the calotte and the level of the calotte, or else the size (number of pixels) of the said calotte.

Materialized Calotte

A materialized calotte is defined as a calotte whose associated characteristics are in a specified value range.

Primitive Associated with a Pixel

The primitive associated with a pixel is defined as a binary value (or in other words 0 or 1) or a Boolean value (or in other words true or false, where in this case the convention will be used that true corresponds to 1 and false corresponds to 0) obtained by predefined arithmetic and/or logical operations on the value of the said pixel and on the values of the pixels joined thereto.

EXAMPLE

FIG. 5 shows a grid 502 of nine pixels 503, wherein one pixel X has a value of 4 and is represented by the symbol 504. This pixel 504 is surrounded by pixels A, B, C, D, E, F, G and H, whose respective values are 1, 2, 3, 4, 5, 6, 7 and 8.

If 2 is selected as the maximum path length for the definition of joined pixels, there can be associated with pixel 504 the following primitives Pa, Pb, Pc, Pd, Pe, Pf, Pg and Ph:

Pa: => logical result of the test: the value of X is larger than the value of A.

Pb: => logical result of the test: the value of X is larger than the value of B.

And so on for C, D, E, F, G, H.

There are obtained the primitives Pa, Pb, Pc, Pd, Pe, Pf, Pg and Ph, whose possible values are "true" and "false", which can also be written respectively as 1 and 0.

Materialized Primitive

A primitive will be said to be materialized if its value is equal to 1.

In the case of the example described in the foregoing, the following table is obtained:
Pa: false⇋0: the primitive is not materialized
Pb: false⇋0: the primitive is not materialized
Pc: false⇋0: the primitive is not materialized
Pd: false⇋0: the primitive is not materialized
Pe: true⇋1: the primitive is materialized
Pf: true⇋1: the primitive is materialized
Pg: true⇋1: the primitive is materialized
Ph: true⇋1: the primitive is materialized

Virtual Image of Stationary Objects

A virtual image of a stationary object is defined as a connected set of pixels in which a number P1 of primitives is materialized, the said number P1 falling within a preselected interval.

DETAILED DESCRIPTION

Other characteristics and advantages of the invention will become clear from reading the description of embodiments, given by way of indicative and non-limitative example, and from reading:

FIG. 6, which represents, in the case of a swimming pool, a general view of the system that permits the detection of objects situated in the vicinity of an interface of water/air type, especially the detection and surveillance of swimmers, FIG. 7, which represents a general organizational diagram of the different parts of the system and of the different interactions between the said parts.

Referring now to FIGS. 6 and 7, a description will be given of the system and of the different parts of which it is composed.

The system according to the invention comprises means, to be described hereinafter, for detecting an object 601 in a zone 603 situated in the proximity of an interface 602 between two liquid media 604 and/or gaseous media 605 having different refractive indices, especially an interface of water/air type. In the present case, the illustrated object 601 is the body of a swimmer moving at the surface of the water of a swimming pool. Within the meaning of the present invention, "in the proximity of" also denotes "at the interface".

The system comprises means, especially a video camera 606, for creating at least one video image of the said interface 603 and of the said zone 602 from at least one observation point 607. These images are represented by electrical signals 608.

Each of the observation points 607 is situated on one side of the said interface 602. In the present case, observation point 607 is situated above the swimming pool. Video camera 606 is an overhead camera disposed openly in the air. The said system also comprises digital conversion means 609 for producing digital data from the electrical signals 608 representative of each video image. The said system also comprises information-processing means for discriminating the data corresponding to the video image of a real object (FIG. 1a) from those corresponding to the apparent video image (FIG. 1b) generated by the said interface 603.

Advantageously, when the said object 601 is illuminated by light that produces reflections at the said interface, the said system is such that the said means for creating at least one video image of the said interface and of the said zone comprise a polarizing filter 611 to eliminate, at least partly, the light reflections at the said interface. This is applicable in particular to the case of a swimming pool reflecting the rays of the sun or of artificial illumination Preferably, the said system can be used in two embodiments, which are not mutually exclusive. The first will be referred to hereinafter as the branch 1 embodiment. The second will be referred to hereinafter as the branch 2 embodiment.

Branch 1

In the case of this embodiment, the said means 700 for information-processing of the data for the purpose of discriminating the data corresponding to the video image of a real object from those that correspond to the apparent video image generated by the said interface comprise calculating means 701, 702, especially a processor 701 and a memory 702. Calculating means 701, 702 are used for:
generating calottes,
associating characteristics with each calotte,
deducing the presence of an object if the characteristics exceed a predetermined threshold SC.

In the case in which the said system is intended more particularly to discriminate between a stationary object (a swimmer in difficulty) and a moving object (a swimmer frolicking in a pool), the said system comprises iterating means 703, associated with a clock 704, for iterating, at specified time intervals, the process, described hereinabove, of deducing the presence of an object. In this case, the said calculating means 701, 702 comprise totalizers 705 for calculating the number of times that the object is detected during a specified time period T1. The said calculating means 701, 702 also comprise discriminators 706 for discriminating, at a point of the said zone, between the objects that are present a number of times larger than a specified threshold S1 and the objects that are present a number of times smaller than the said specified threshold S1. In the first case, the said objects are referred to hereinafter as stationary objects, and in the second case the said objects are referred to hereinafter as moving objects.

According to the branch 1 embodiment, in the case in which the system is intended more particularly to determine whether a stationary object is situated:

- on the other side of the interface (for example, a swimmer in difficulty under the water),
- on the same side of the interface (for example, a bather standing in a shallow pool),
- at the interface (for example, a swimmer floating on his back)

relative to one of the said observation points, the said calculating means also comprise means 707 for calculating the mean fluctuation per unit time of the gray levels of the said video images of the said object. For this purpose, the video images are recorded from the said observation point at specified time intervals. Three cases can be considered:

Case in which the Object (the Swimmer) is Situated on the Other Side of the Interface (Under the Water)

In the case in which the object is situated on the other side of the interface, the said calculating means also comprise detecting means 708a for detecting, at a point of the said zone, the objects that exhibit a mean fluctuation per unit time of the gray levels larger than a specified threshold S3. The said objects are referred to hereinafter as objects situated on the other side of the interface.

Case in which the Object (the Swimmer) is Situated on the Same Side of the Interface (in Standing Position in a Shallow Pool)

In the case in which the object is situated on the same side of the interface, the said calculation means also comprise detecting means 708b for detecting, at a point of the said zone, the objects that exhibit a mean fluctuation per unit time of the gray levels smaller than a specified threshold S4, the said threshold S4 being smaller than threshold S3. The said objects are referred to hereinafter as objects situated on the same side of the interface.

Case in which the Object is Situated at the Interface (Case in which the Swimmer is Swimming at the Surface)

In the case in which the object is situated at the interface, the said calculating means also comprise detecting means 708c for detecting, at a point of the said zone, the objects that exhibit a mean fluctuation per unit time of the gray levels between threshold S3 and threshold S4. The said objects are referred to hereinafter as objects situated at the interface.

According to another embodiment, in the case of stationary objects, when the said system is intended more particularly to determine whether a stationary object is situated:

- on the other side of the interface (for example, a swimmer in difficulty under the water),
- on the same side of the interface (for example, a bather standing in a shallow pool),
- at the interface (for example, a swimmer floating on his back)

relative to one of the said observation points, the said system also comprises means 709 for stereoscopic analysis of the object that is stationary relative to the said interface. For this purpose, the video images are recorded from the said observation point at specified time intervals. Such stereoscopic analysis means have been described in a patent application, in French Application No. 99-16124, filed Dec. 21, 1999 and published Jun. 22, 2001 as French Patent 2802653.

Preferably, the said system using one or the other of the foregoing two methods also includes emitting means 716 for emitting a warning signal 711 according to the detection criteria described hereinabove, especially in the presence of a stationary object situated under the surface of a water/air interface. For example, in the case of application of the system according to the invention to surveillance of a swimming pool, the system activates a horn or a pager to alert the lifeguards when a swimmer has been motionless for too long under the water surface.

In the case of the embodiment constituting the object of the first branch, when the system according to the invention is intended more particularly to detect the appearance of new objects in the said zone, the said system comprises iterating means 703 associated with a clock 704 for iterating, at specified time intervals, the process, described hereinabove, of deducing the presence of an object.

The said calculating means 701, 702 also comprise means for calculating the number of times that the object is detected during a specified time period T2. The said time period T2 is chosen to be longer than the duration of the phenomena associated with the objects being detected. The said calculating means also comprise discriminating means 712 for discriminating, at a point of the said zone, between the objects that are present a number of times larger than a specified threshold S2 and the objects that are present a number of times smaller than the said specified threshold S2. The said objects are referred to hereinafter as usually present objects and as new objects respectively.

Advantageously, when the system is intended more particularly to detect new and stationary objects, the time period T1 is chosen to be shorter than the time period T2.

Branch 1, Module D of Memorandum Jun. 20, 2000.

In the case of the embodiment according to the first branch, when the said system is intended more particularly to yield a statistical estimate of the time of occupancy of the said zone Z by at least one object during a specified time period T, the said system comprises partitioning means 713 for performing a partition of the said zone into elemental zones $\Delta z$. In this case, the said system also comprises iterating means 703 associated with a clock 704 for iterating the process of deducing the presence of an object in an elemental zone $\Delta z$ during elemental time intervals $\Delta t$. In this case also, the said calculating means 701, 702 also comprise means for calculating the number of times $\Delta t/T$ that an object is present in an elemental zone $\Delta z$ during the specified time period T.

In the case of the embodiment according to the first branch, the said calculating means 701, 702 also comprise means for calculating the trajectory of objects whose presence has been detected. In this case, when the system is intended more particularly to detect the disappearance of an object in a specified zone, especially when a swimmer disappears at the seashore or a swimmer strays from the authorized zone of a surf pool, the said method also comprises detecting means for detecting when a trajectory stops at the boundary of the said zone, especially beyond the surveillance limits.

Branch 2

A second embodiment (referred to as the second branch) will now be described. This second embodiment, which is not exclusive of the first, can be operated by using the same elements. They will be represented by the same numerical symbols.

In the case of the branch 2 embodiment, when the said system according to the invention is intended more particularly to detect a stationary object (for example, a swimmer in difficulty in a swimming pool) in the proximity of the said interface, the said information-processing means 700 for discriminating the data corresponding to the video image of a real object 601 from those corresponding to the apparent video image generated by the said interface 602 comprise calculation means 701, 702 exhibiting the technical features described hereinafter. The said calculating means 701, 102 comprise associating means 714 for associating primitives with each pixel of the said video image. The said calculating means also comprise validating means for validating a primitive as stationary if, during n successive time intervals Δt composing a specified time period T5, the said primitive is materialized at least a number of times larger than a specified threshold S5. The said calculating means also comprise means for calculating and searching for the virtual images of stationary objects.

In the case of the embodiment constituting the object of the second branch, when the said system is intended more particularly to detect a new stationary object in the proximity of the said interface, the said system comprises iterating means 703, associated with a clock 704, for iterating, at successive time intervals Δt composing a specified time period T6, the process of detecting the presence of a stationary object. In this case, the said calculating means comprise means for calculating the number of times that an object is detected as being stationary during the said specified time period T6. The said time period T6 is chosen to be longer than the duration of the phenomena associated with the object being detected. The said time period T6 is shorter than the said time period T5. In this case also, the said calculating means comprise discriminating means 712 for discriminating, at a point of the said zone, between a stationary object that is present a number of times larger than a specified threshold S6 and an object that is present a number of times smaller than the said specified threshold S6. The said object is referred to hereinafter as the new stationary object. In the case of a swimming pool, for example, such an object could be a swimmer in difficulty who has been immobilized.

In the case of the embodiment constituting the object of the second branch, when the said system is intended more particularly to determine whether a new stationary object is situated:

on the other side of the interface (for example, a swimmer in difficulty under the water),
on the same side of the interface (for example, a bather standing in a shallow pool),
at the interface (for example, a swimmer floating on his back)

relative to one of the said observation points, the said system also comprises iterating means 703, associated with a clock 704, for iterating, at successive time intervals Δt composing a specified time period T7, the process of detecting the presence of a stationary object. For this purpose, the video images are recorded from the said observation point at specified time intervals. In this case also, the said calculating means 701, 702 also comprise means for calculating the number of times that an object is detected as being stationary and new during the said specified time period T7. The said time period T7 is chosen to be longer than the duration of the phenomena being observed. The said time period T7 is shorter than the said time period T6. Three cases can be considered:

Case in which the Object is Situated on the Other Side of the Interface (Under the Water)

In the case in which the object is situated on the other side of the interface, the said calculating means comprise detecting means 708*a* for detecting, at a point of the said zone, between an object that is present a number of times larger than a specified threshold S7 and an object that is present a number of times smaller than the said specified threshold S7. The said object is referred to hereinafter as the new stationary object situated on the other side of the interface.

Case in which the Object is Situated on the Same Side of the Interface (for Example, a Swimmer in Standing Position in a Shallow Pool)

In the case in which the object is situated on the same side of the interface, the said calculating means also comprise detecting means 708*b* for detecting, at a point of the said zone, between an object that is present a number of times larger than a specified threshold S8 and an object that is present a number of times smaller than the said specified threshold S8. The said threshold S8 is smaller than threshold S7. The said object is referred to hereinafter as the new stationary object situated on the same side of the interface.

Case in which the Object is Situated at the Interface (for Example, a Swimmer Floating on his Back)

In the case in which the object is situated at the interface, the said calculating means comprise detecting means 708*c* for detecting, at a point of the said zone, an object that is present a number of times between threshold S7 and threshold S8. The said objects are referred to hereinafter as objects situated at the interface.

In these three different cases, the system also includes emitting means 716 for emitting a warning signal 711 according to the detection criteria applied in one or the other of these cases, especially in the presence of a stationary object situated under the surface of a water/air interface.

FIGS. 8 and 9 show the history of events observed by camera 606 by symbolizing, by means of shaded rectangles on time axis 800, the elemental time intervals in which an object was detected.

In the case of FIG. 8, the history of events was recorded during the time period [t−T1, t]. At instant t, the number S of times that the object has been detected is known. The decision algorithm is as follows:

If S is above a threshold S1, it is deduced that the object is stationary;

If S is below threshold S1 and if it is observed that the object is present at instant t, the observed object is moving.

In the case of FIG. 9, the history of events was recorded during the time period [t−T2, t], where T2 is longer than T1. At instant t, the number S' of times that the object has been detected is known. The decision algorithm is as follows:

If S' is above S2, the object is not new.

If S' is not above S2, the object is new.

If S is above S1, the object is new and stationary.

The invention claimed is:

1. A method for detecting an object in a zone situated proximate to an interface between two liquid media and/or gaseous media having different refractive indices, the method comprising:

creating at least one video image of the interface and of the zone from at least one observation point, each observation point being situated on one side of the interface;

producing electrical signals representative of each video image;

digitizing the electrical signals to produce data corresponding to each video image;

processing the data, for the purpose of discriminating the data corresponding to the video image of a real object from those that correspond to an apparent video image generated by the interface;

generating calottes from each video image;

associating characteristics with each calotte;

deducing a presence of an object when the characteristics exceed a predetermined threshold;

iterating, at specified time intervals, the operation of deducing the presence of an object;

calculating a number of times that the object is detected during a first specified time period;

discriminating, at a point of the zone, between an object that is present a number of times larger than a first specified threshold as a stationary object, and an object that is present a number of times smaller than the first specified threshold as a moving object;

performing a stereoscopic analysis of the object that is stationary relative to the interface;

determining whether a stationary object is situated on an other side of the interface, on a same side of the interface, or at the interface, relative to one of the observation points, each video image being recorded from the observation point at specified time intervals.

2. A method according to claim 1, wherein the object is illuminated by light that produces light reflections at the interface, and the method further comprising:

creating at least one video image of the interface and of the zone by using a polarizing filter to eliminate, at least partly, the light reflections at the interface.

3. A method according to claim 1, configured to determine whether a stationary object is situated: on an other side of the interface, on a same side of the interface, or at the interface, relative to one of the observation points;

each video image being recorded from the observation point at specified time intervals;

the method further comprising:

calculating a mean fluctuation per unit time of gray levels of the video images of the object;

detecting, at a point of the zone, objects that exhibit a mean fluctuation per unit time of the gray levels larger than a third specified threshold as objects situated on the other side of the interface;

detecting, at a point of the said zone, objects that exhibit a mean fluctuation per unit time of the gray levels smaller than a fourth specified threshold as objects situated on the same side of the interface, the fourth threshold being smaller than the third threshold;

detecting, at a point of the zone, objects that exhibit a mean fluctuation per unit time of the gray levels between the threshold S3 and the threshold S4 as objects situated at the interface.

4. A method according to claim 3, further comprising:

emitting a warning signal according to the detecting operations in detecting the presence of a stationary object situated under a surface of a water/air interface as the interface.

5. A method according to claim 1, configured to detect appearance of new objects in the zone, the method further comprising:

iterating, at specified time intervals, the operation for deducing the presence of an object;

calculating a number of times that the object is detected during a second specified time period, the second time period being longer than a duration of a phenomena associated with the objects being detected;

discriminating, at a point of the zone, between objects that are present a number of times larger than a second specified threshold as usually present objects, and objects that are present a number of times smaller than the second specified threshold as new objects.

6. A method according to claim 5, configured to detect new and stationary objects, wherein the first time period is shorter than second time period.

7. A method according to claim 1, configured to yield a statistical estimate of a time of occupancy of the zone by at least one object during a third specified time period, the method further comprising:

performing a partition of the zone into elemental zones;

applying the operation of deducing the presence of an object in one of the elemental zones during elemental time intervals;

calculating a number of times that an object is present in one of the elemental zones during the third specified time period.

8. A method according to claim 1, the method further comprising:

calculating a trajectory of objects whose presence has been detected.

9. A method according to claim 8, configured to detect disappearance of an object in the zone, the method further comprising:

detecting when a trajectory stops at a boundary of the zone.

10. A method according to claim 1, configured for surveillance of a swimming pool.

11. A system for detecting an object in a zone situated proximate to an interface between two liquid media and/or gaseous media having different refractive indices, the system comprising:

means for creating at least one video image of the interface and of the zone from at least one observation point, each observation point being situated on one side of the interface;

digital conversion means for producing digital data from the electrical signals representative of each video image;

information-processing means for discriminating the digital data corresponding to the video image of a real object from those corresponding to an apparent video image generated by the interface;

generating means for generating calottes from each video image;

calculating means for associating characteristics with each calotte and for deducing a presence of an object when the characteristics exceed a predetermined threshold;

iterating means for iterating, at specified time intervals, the operation of deducing the presence of an object;

totalizer means for calculating a number of times that the object is detected during a first specified time period;

discriminating means for discriminating, at a point of the zone, between an object that is present a number of times larger than a first specified threshold as a stationary object, and an object that is present a number of times smaller than the first specified threshold as a moving object; and means for stereoscopic analysis of the object that is stationary relative to the interface;

means for determining whether a stationary object is situated on an other side of the interface, on a same side of the interface, or at the interface, relative to one of the observation points, each video image being recorded from the observation point at specified time intervals.

12. A system according to claim 11, wherein the object is illuminated by light that produces reflections at the interface, wherein the means for creating at least one video image of the interface and of the zone comprises a polarizing filter to eliminate, at least partly, the light reflections at the interface.

13. A system according to claim 11, configured to determine whether a stationary object is situated: on an other side of the interface, on a same side of the interface, or at the interface, relative to one of the observation points;

the video images being recorded from the observation point at specified time intervals;

the calculating means further comprising:

means for calculating a mean fluctuation per unit time of gray levels of the video images of the object;

detecting means for detecting, at a point of the zone, objects that exhibit a mean fluctuation per unit time of the gray levels larger than a third specified threshold as objects situated on the other side of the interface;

detecting means for detecting, at a point of the zone, objects that exhibit a mean fluctuation per unit time of the gray levels smaller than a third specified threshold as objects situated on the same side of the interface, the forth threshold being smaller than the third threshold;

detecting means for detecting, at a point of the zone, objects that exhibit a mean fluctuation per unit time of the gray levels between the threshold S3 and the threshold S4 as objects situated at the interface.

14. A system according to claim 13, further comprising:

emitting means for emitting a warning signal according to outputs of the detecting means in detecting the presence of a stationary object situated under a surface of a water/air interface as the interface.

15. A system according to claim 11, configured to detect appearance of new objects in the zone, the system further comprising:

iterating means for iterating, at specified time intervals, the operation of deducing the presence of an object;

the calculating means further comprising:

means for calculating a number of times that the object is detected during a second specified time period, the second time period being longer than a duration of a phenomena associated with the objects being detected;

means for discriminating, at a point of the zone, between objects that are present a number of times larger than a second specified threshold as usually present objects, and objects that are present a number of times smaller than the specified threshold S2 as new objects.

16. A system according to claim 15, configured to detect new and stationary objects, wherein the first time period is shorter than the second time period.

17. A system according to claim 14, configured to yield a statistical estimate of a time of occupancy of the zone by at least one object during a third specified time period, the system further comprising:

partitioning means for performing a partition of the zone into elemental zones;

iterating means for iterating, in one of the elemental zones during elemental time intervals, the operation of deducing the presence of an object;

the calculating means further comprising means for calculating a number of times that an object is present in one of the elemental zones during the third specified time period.

18. A system according to claim 11, the calculating means further comprising means for calculating a trajectory of objects whose presence has been detected.

19. A system according to claim 18, configured to detect disappearance of an object the zone, the system further comprising:

detecting means for detecting when a trajectory stops at a boundary of the zone.

20. A system according to claim 11, configured for surveillance of a swimming pool.

* * * * *

UNITED STATES PATENT AND TRADEMARK OFFICE
CERTIFICATE OF CORRECTION

PATENT NO.         : 7,362,351 B2
APPLICATION NO. : 10/433571
DATED                 : April 22, 2008
INVENTOR(S)       : Meniere et al.

Page 1 of 1

It is certified that error appears in the above-identified patent and that said Letters Patent is hereby corrected as shown below:

On the title page, Item (75), the Inventors' information is incorrect. Item (75) should read:

-- (75)    Inventors:    Jerome Meniere, Paris (FR); Martin Lefebure, Courbevoie (FR); Frederic Guichard, Paris (FR); Christophe Migliorini, Puteaux (FR) --

Signed and Sealed this

Eighth Day of July, 2008

JON W. DUDAS
*Director of the United States Patent and Trademark Office*